(12) United States Patent
Deciry et al.

(10) Patent No.: US 7,608,786 B2
(45) Date of Patent: Oct. 27, 2009

(54) SPLICE PLATE FOR A WIRE CABLE TRAY

(75) Inventors: James Deciry, Crouy (FR); Stephane Quertelet, Remy (FR)

(73) Assignee: I.C.M. Group, Montbard (FR)

( * ) Notice: Subject to any disclaimer, the term of this patent is extended or adjusted under 35 U.S.C. 154(b) by 76 days.

(21) Appl. No.: 11/886,424

(22) PCT Filed: Mar. 9, 2006

(86) PCT No.: PCT/FR2006/000521

§ 371 (c)(1),
(2), (4) Date: Nov. 8, 2007

(87) PCT Pub. No.: WO2006/097600

PCT Pub. Date: Sep. 21, 2006

(65) Prior Publication Data

US 2008/0179089 A1 Jul. 31, 2008

(30) Foreign Application Priority Data

Mar. 14, 2005 (FR) .................................. 05 02462

(51) Int. Cl.
H01B 7/00 (2006.01)

(52) U.S. Cl. ..................................... 174/135; 174/99 R

(58) Field of Classification Search ................. 174/135, 174/99 R; 248/41, 49, 58; 52/677, 696, 52/712

See application file for complete search history.

(56) References Cited

U.S. PATENT DOCUMENTS

| 5,899,041 | A | * | 5/1999 | Durin | 52/660 |
| 6,193,434 | B1 | | 2/2001 | Durin et al. | |
| 6,590,154 | B1 | * | 7/2003 | Badey et al. | 174/480 |
| 2003/0108385 | A1 | | 6/2003 | Finco et al. | |
| 2005/0063775 | A1 | * | 3/2005 | Boltz | 403/397 |

FOREIGN PATENT DOCUMENTS

| FR | 2 017 070 | 5/1970 |
| JP | 2002-266823 A | 9/2002 |
| WO | WO 03/049247 | 6/2003 |

* cited by examiner

*Primary Examiner*—William H Mayo, III
(74) *Attorney, Agent, or Firm*—Young & Thompson

(57) ABSTRACT

A splice plate which is used to connect two cable tray sections, whereby each section comprises longitudinal warp wires and transverse weft wires. The inventive splice plate has: an elongated base; a lateral flange, known as the upper flange, which extends essentially perpendicularly to the base from a first longitudinal edge of same; and a lateral flange, known as the lower flange, which extends essentially perpendicularly to the base from the longitudinal edge opposite the first longitudinal edge. Each of the two flanges is equipped with a notch that opens at the free edge of the corresponding flange, wherein said two notches are disposed facing one another. The upper lateral flange has coupling means on either side of the notch, which are intended to co-operate with a warp wire of a cable tray section.

20 Claims, 5 Drawing Sheets

SPLICE PLATE FOR A WIRE CABLE TRAY

Figure 1:
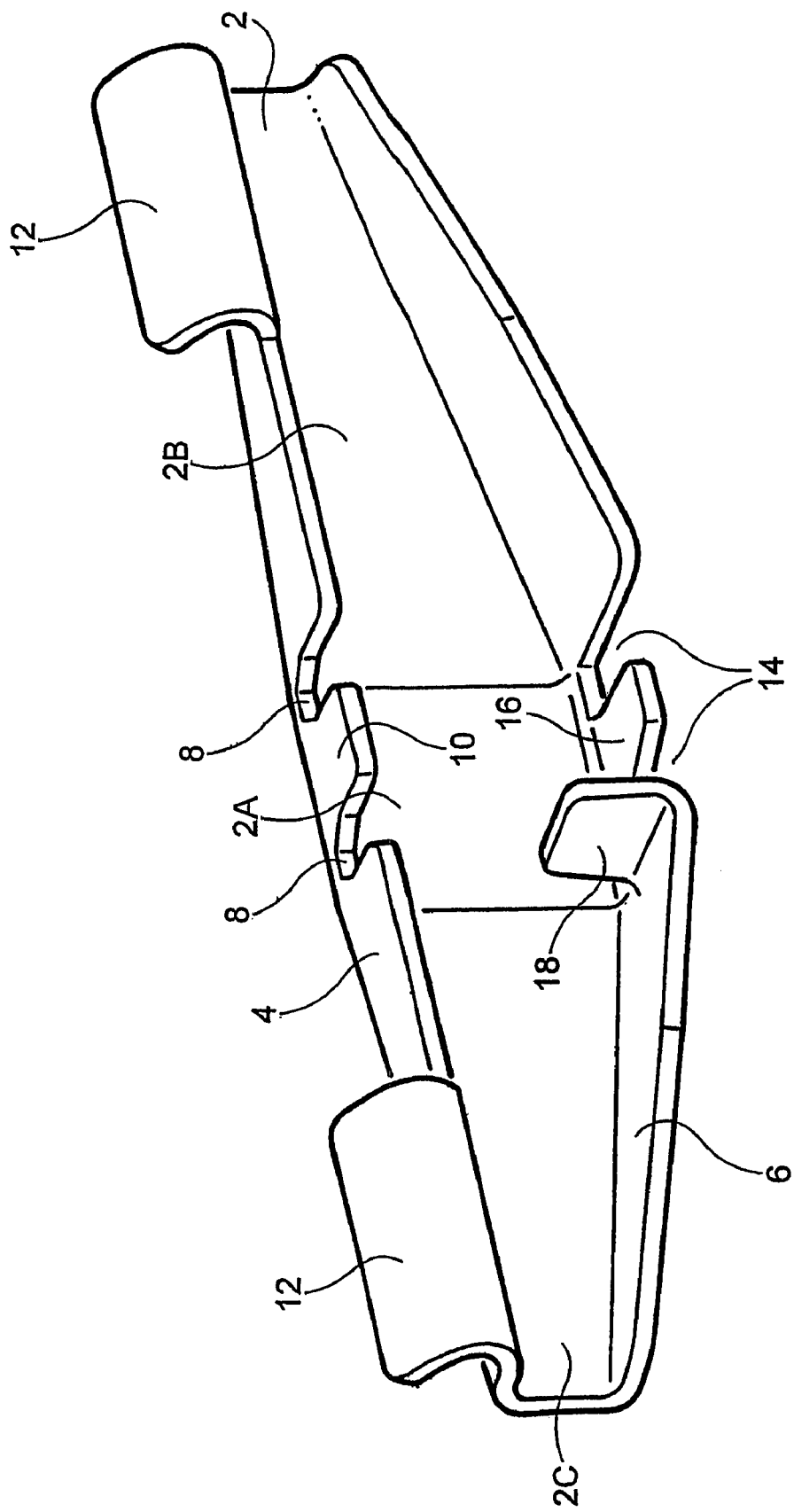

The present invention concerns a splice plate for a wire cable tray.

Wire cable trays known in the art take the form of a wire mesh channel. The mesh includes on the one hand longitudinal wires usually called warp wires that extend in a rectilinear or quasi-rectilinear manner over the whole length of the cable tray and on the other hand wires disposed transversely from place to place along the warp wires, these wires being called weft wires. The latter wires are generally U-shaped and the cable tray therefore comprises three panels overall, namely a bottom panel and two side panels.

Such cable trays are routinely used to house, support and protect flexible conduits, in particular electrical or similar conduits (cables and/or fibers adapted to transmit information electrically, optically or otherwise).

A cable tray often consists of a plurality of sections assembled end-to-end or at an angle or providing a T-shape, X-shape, Y-shape or other shape branch. Connecting devices, also called splice plates, are then used to connect the various sections of the cable tray.

It is known to use bolted connecting parts to hold two sections of cable tray placed end-to-end. The drawback of these connecting parts is that they are tedious to fit. When making the connection, the fitter must at the same time hold at least one section of cable-tray and both the male and female parts to be bolted together. If the cable tray is high up, this connection operation is all the more difficult.

There also exist connections without screws or bolts. The documents EP-1 360 749 and EP-1 451 910 each disclose a splice plate that can be fitted by simple nesting and/or clipping. Once the splice plate has been placed in position, locking it to each of the sections of cable tray is achieved by means of a tongue adapted to be bent.

These prior art splice plates provide an excellent connection of two sections of cable tray. They are placed between two warp wires of the same side panel of the cable tray. Bearing on those two warp wires, the prior art splice plates impart rigidity to the connection obtained.

However, there exist cable trays the side panels whereof are low, and so include only one warp wire. The known prior art splice plates are then unsuitable for connecting two sections of such a cable tray. A bolted assembly must then be provided for connecting two cable trays.

An object of the present invention is therefore to provide a splice plate for connecting two sections of cable tray that makes the connection obtained rigid even if the cable tray is low and includes only one warp wire per side panel.

To this end it proposes a splice plate for wire cable trays intended to connect two sections of that cable tray placed end-to-end, each section of cable tray including on the one hand longitudinal warp wires and on the other hand transverse weft wires.

According to the invention this splice plate has an elongate bottom, an upper side flange extending substantially perpendicularly to the bottom from a first longitudinal edge thereof, and a lower side flange extending substantially perpendicular to the bottom from the longitudinal edge opposite the first longitudinal edge; each of the two flanges has at least one notch opening into the free edge of the corresponding flange, the two notches facing each other, and the upper side flange includes on either side of its notch attachment means adapted to cooperate with a warp wire of a section of cable tray.

Like any splice plate, this new splice plate is intended to connect two ends of sections of cable tray. It is more particularly intended to hook over an edge wire of each section to be connected and the notches receive an end weft wire of each of the sections to be connected. An edge wire is a longitudinal warp wire that connects ends of transverse weft wires.

The position of this new splice plate is defined on the one hand by it being hooked over a longitudinal wire, generally an edge wire, and on the other hand by the positioning of the notches straddling two end weft wires. The bottom of the splice plate confers rigidity on the connection made by the splice plate.

For improved positioning of the splice plate relative to each of the sections of cable tray to be connected, each flange preferably includes two adjacent notches separated from each other by a spacer tongue. Each of the notches of a flange thus receives an end weft wire of a section of cable tray, which ensures improved positioning of the splice plate relative to each of the sections connected.

In a splice plate of the invention, the notches formed in the upper and lower flanges are preferably substantially centrally positioned relative to the bottom of the spliced plate.

In one preferred embodiment, the attachment means include, for example, a tongue extending in a curved manner from the free edge of the upper flange opposite the bottom of the splice plate toward the bottom of the splice plate, the tongue being curved toward the exterior of the splice plate, i.e. to the side opposite the lower flange.

To increase the rigidity of the connection made by the splice plate, the attachment means are advantageously disposed in the vicinity of the ends of the splice plate. In this way, the attachment means are far removed from the boundary area between the two sections of cable tray to be connected and can therefore absorb high bending forces.

In one preferred embodiment, locking means are associated with one notch. In some cases this enables the splice plate to be fitted to cable trays whose weft wires have different diameters. The notch associated with the locking means is advantageously located in the lower side flange, i.e. the side flange that does not carry the attachment means. One embodiment of these locking means provides, for example, for them to include a locking tongue that can be bent from a first position in which it allows free access to the notch with which it is associated to a second position in which it closes said notch at least partially. This embodiment of the locking means is suitable for fitting the splice plate to cable trays made of wires with different diameters. Other locking means can also be used. These can be clipping means, for example. Such means can adapt within a restricted range to various wire diameters. These locking means can also consist in an adaptation of the notch to the dimension of the weft wires so as to clamp the wire in place in the notch.

To avoid damaging cables in the cable tray, the bottom of the splice plate is advantageously of concave shape, the concave side being on the same side as the flanges of the splice plate. This concave bottom is then advantageously disposed so that the concave side is oriented toward the exterior of the cable tray. Thus if cables are pulled inside the cable tray, they slide along the convex space of the bottom and are not damaged.

Figure 2:
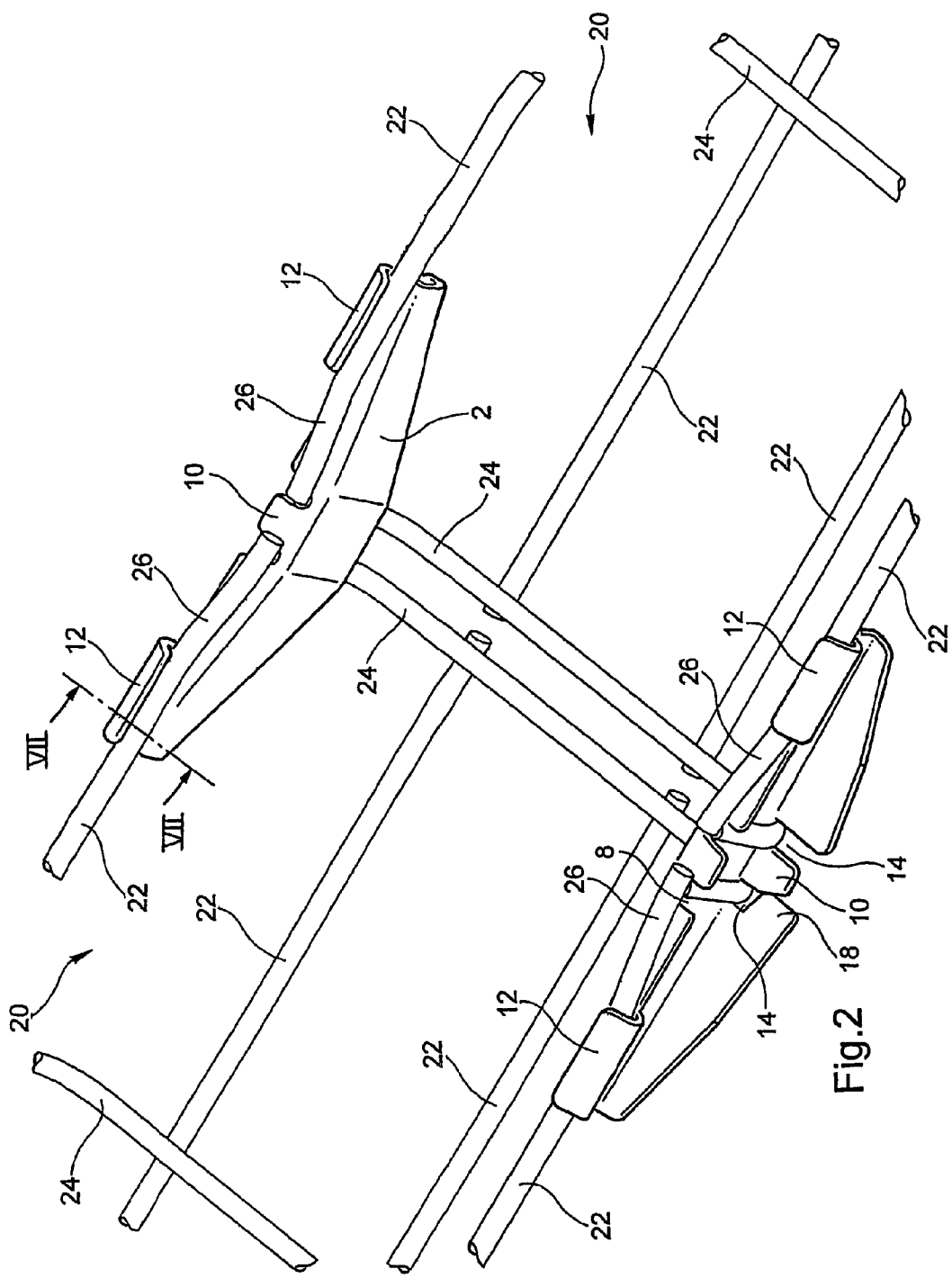
Figure 3:
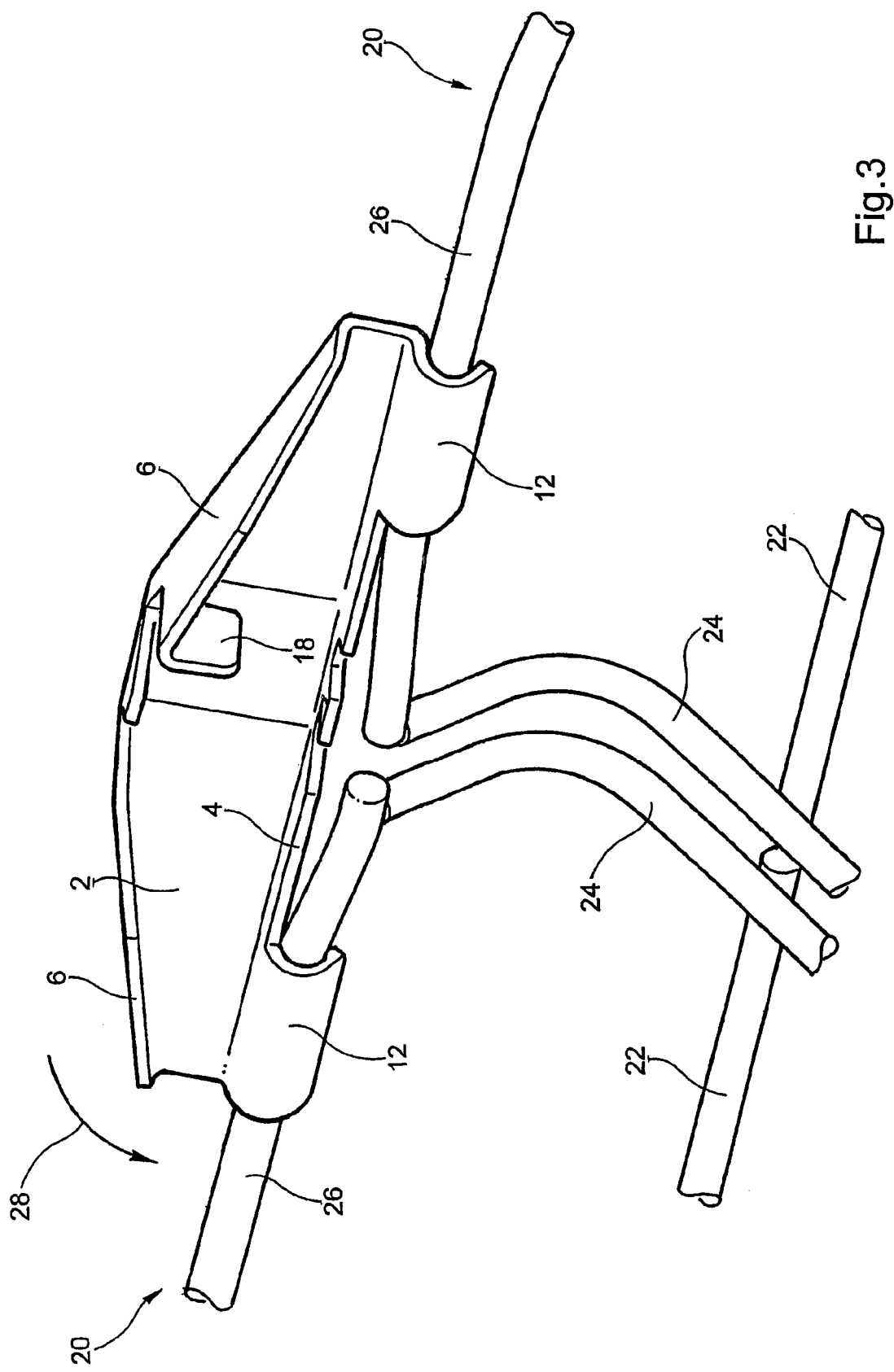
Figure 4:
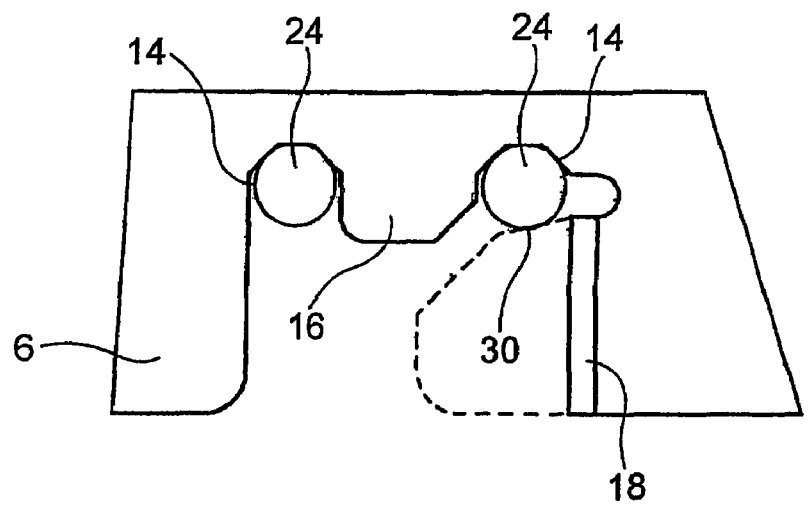
Figure 5:
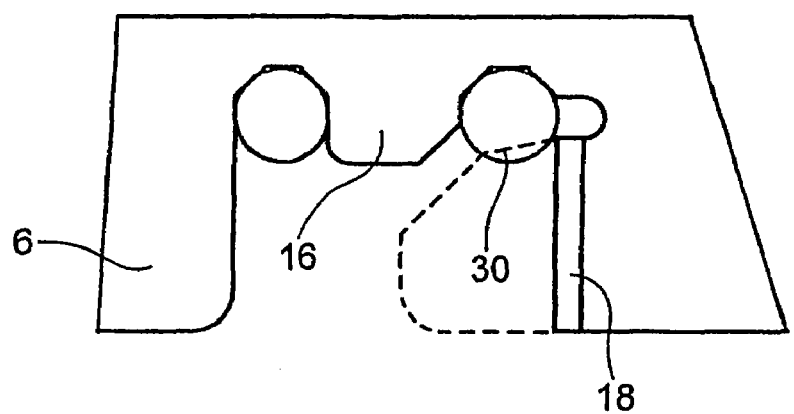
Figure 6:
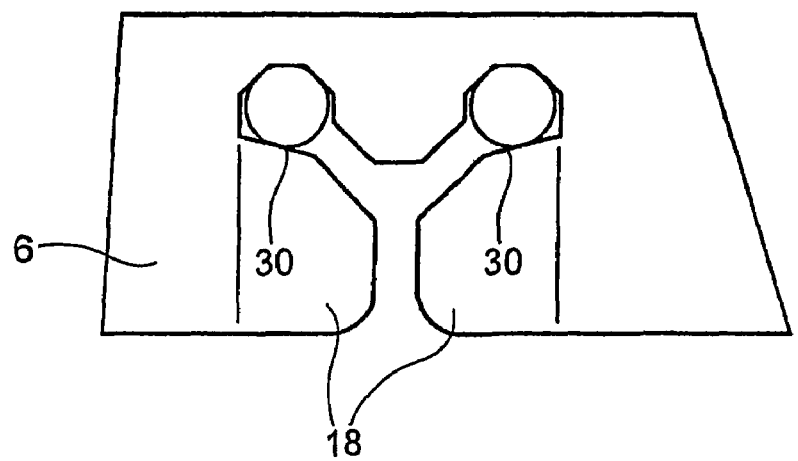
Figure 8:
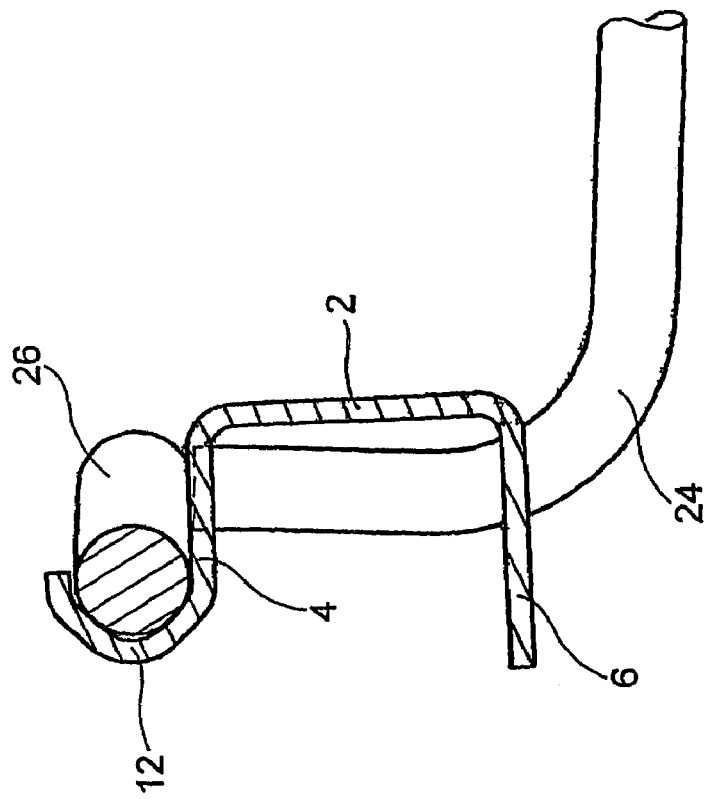
Figure 7:
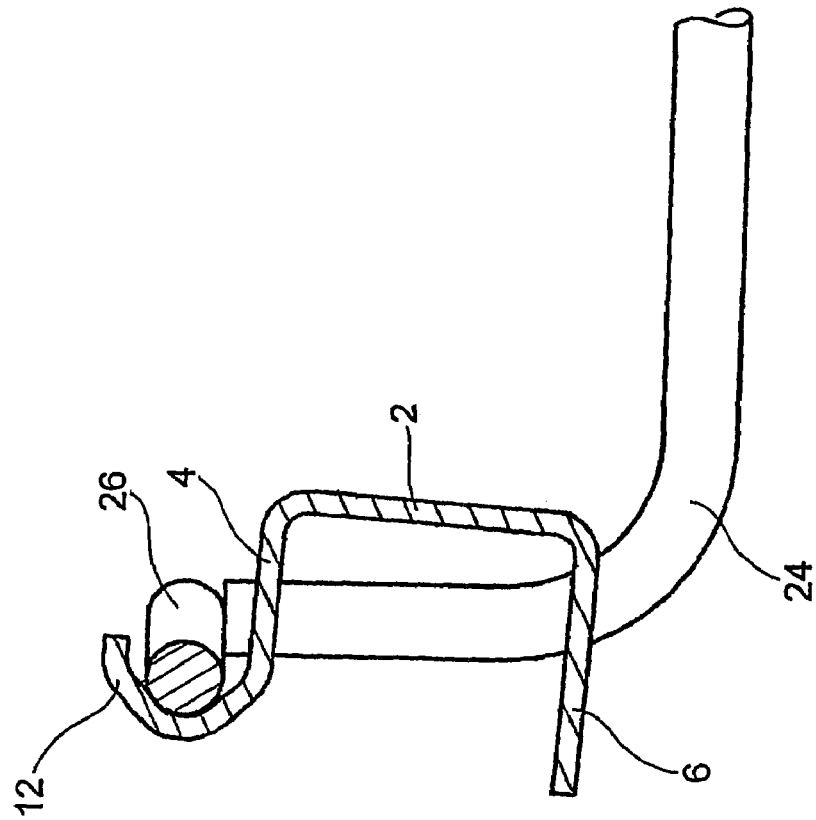

Details and advantageous of the present invention will emerge better from the following description, given with reference to the appended diagrammatic drawings, in which:

FIG. 1 is a perspective view of a splice plate of the invention,

FIG. 2 is a perspective view of two ends of sections of cable tray connected by means of two splice plates of the invention, FIG. 3 shows a slice plate of the invention during the fitting thereof, FIG. 4 is a detail view showing from above the locking of a splice plate of the invention onto an end weft wire of a section of cable tray, FIG. 5 is a view similar to the FIG. 4 view with a weft wire of greater diameter, FIG. 6 is a view corresponding to the views of FIGS. 4 and 5 for a different embodiment of a splice plate of the invention, FIG. 7 is a view in section taken along the section line VII-VII in FIG. 2, and FIG. 8 is a view similar to that of FIG. 7 for a cable tray having an edge wire of larger diameter.

FIG. 1 represents a splice plate of the invention. The latter includes a bottom 2, an upper side flange 4 and a lower side flange 6.

The bottom 2 of the splice plate has an elongate shape. The upper side flange 4 and the lower side flange 6 extend substantially perpendicularly to the bottom 2 from one longitudinal edge of that bottom. Both side flanges 4 and 6 are oriented on the same side of the bottom 2.

The bottom 2 has a concave shape, the concave side being on the same side as the side flanges 4 and 6. At its center, the bottom 2 has a substantially square and plane first area 2A. To each side of this first area 2A extends a side area 2B or 2C. These two side areas 2B, 2C are symmetrical with respect to the first area 2A. Each of these side areas 2B, 2C has the shape of a right-angle trapezium. The side of the trapezium perpendicular to the bases of the trapezium is on the same side as the upper flange 4. The larger base of the trapezium is in each case oriented to the side of the first area 2A while the smaller base forms the free end of the bottom 2 of the splice plate. The side areas 2B, 2C are also slightly inclined to impart a concave shape to the bottom 2.

The upper side flange 4 is substantially plane. Its width is maximum in the region of the first area 2A and decreases in the direction toward the ends of the splice plate.

Two notches 8 are formed in the upper side flange 4 in the region of the first area 2A of the bottom of the splice plate. Each of these notches 8 opens into the free edge of the upper side flange 4 opposite the bottom 2 and extends substantially as far as that bottom 2. These notches 8 extend transversely relative to the upper side flange 4 and the bottom of the notch is approximately rounded. These notches are intended to receive a weft wire of a cable tray and their shapes and dimensions are adapted to the shapes and dimensions of the wires to be accommodated.

The two notches 8 in the upper side flange 4 define between them a separator and spacer tongue 10.

Note in the appended drawings that the upper side flange 4 carries at each end of the splice plate attachment means consisting of a curved tongue referred to hereinafter as the lug 12. Each of the lugs 12 is curved, starting from the free edge of the upper side flange 4, on the one hand toward the exterior of the splice plate and on the other hand in the direction of its bottom 2. It is considered here that the interior of the splice plate substantially corresponds to the space delimited by the bottom 2 and the side flanges 4, 6 of the splice plate. These lugs 12 are produced symmetrically in the vicinity of the two ends of the upper side flange 4.

The lower side flange 6 follows the corresponding longitudinal edge of the bottom 2 of the splice plate and therefore is substantially cup-shaped with the concave side on the same side as the bottom 2 (and the upper side flange 4). Like the upper side flange 4, the lower side flange 6 has in the region of the first area 2A of the bottom 2 of the splice plate two notches 14. The notches 14 are substantially similar to the notches 8 and face the latter. There is also a separator and spacer tongue 16 between the notches 14.

Like the upper side flange 4, the lower side flange 6 has a maximum width at the center of the splice plate, i.e. in the region of the first area 2A of the bottom 2 of the splice plate, and a lesser width at the ends of the splice plate.

The lower side flange 6, i.e. the flange opposite that carrying the attachment means, carries a locking tongue 18. This tongue is disposed at the edge of one notch 14 and extends, in a first position, substantially perpendicularly to that notch 14. Thus in this first position the locking tongue allows free access to the corresponding notch. This tongue 18 can be bent so as partially to close the corresponding notch.

FIG. 2 shows the use of two splice plates like that shown in FIG. 1. These two splice plates connect two sections 20 of a cable tray. In the conventional way, each of the sections 20 is trough-shaped and comprises longitudinal wires 22 called warp wires and transverse wires 24 called weft wires. In the conventional way, each section 20 has a weft wire 24 at its end. In an equally conventional way, a warp wire 22, also called an edge wire 26, connects the ends of all the weft wires 24. The splice plates are mounted on these edge wires 26. This cable tray has a bottom panel and two side panels (or flanks). Here the side panels are low and thus have only one warp wire, which constitutes the edge wire 26.

Note that in the fitted position the edge wires 26 take their place in the lugs 12. The weft wires 24 at the ends of the sections 20 of the cable tray are accommodated in the notches 8 and 14. The locking tongue 18 is bent to close the opening of the corresponding notch 14. The separator tongues 10, 16 maintain a space between the weft wires 24 at the ends of the sections 20 of cable tray.

Note in FIG. 2 that the bottom 2 of the splice plates is inside the cable tray. The curved shape of this bottom is oriented so that the convex portion of the bottom 2 is inside the cable tray. Thus when cables are placed in the cable tray, the splice plate has no edge that could damage the cables.

FIG. 3 shows one example of fitting a splice plate from FIG. 1 to the ends of two sections 20 of cable tray placed end-to-end in order to connect those two sections 20. As shown in FIG. 3, when the sections 20 are placed end-to-end, one in alignment with the other, the lugs 12 can each be hooked over one edge wire 26 so that the lugs 12 are oriented toward the interior of the cable tray and the bottom of the splice plate is above the cable tray (it is assumed here that the edge wires are at the top of the cable tray). It is clear in this figure, and likewise in FIG. 2, how the lugs 12 cooperate with the edge wires 26 in the manner of a hook. The splice plate is then pivoted toward the interior of the cable tray, the lugs 12 remaining hooked over the edge wires 26. An arrow 28 in FIG. 3 indicates the direction of rotation of the splice plate. The latter is pivoted until the weft wires 24 at the ends of the sections 20 reach the bottom of the notches 8 and 14. The locking tongue 18 can then be bent to trap the corresponding weft wire 24.

The splice plate fitted in this way provides a very rigid connection. To obtain this high rigidity, it is of course necessary to fit a splice plate to each side of the cable tray, i.e. to each of the edge wires. The splice plates then prevent any flexing of the cable trays about a transverse axis. Such flexing is prevented on the one hand by the bearing points provided in the region of the lugs of the splice plate and on the other hand by the bearing points in the region of the notches of the splice plates.

FIGS. 4 and 5 show from above and to a larger scale two notches 14 of a splice plate. Weft wires 24 are inserted in these notches. Note that the separator tongue 16 maintains a minimum spacing corresponding to the width of this tongue between the weft wires 24. The locking tongue 18 is represented in solid line in its position allowing insertion of the weft wires 24 into the notches 14 and in dashed line in its bent position preventing withdrawal of the weft wires 24 from the notches 14. As can be seen, it suffices here to lock a single weft wire 24 to retain the splice plate firmly on the cable tray.

FIG. 6 shows an embodiment with two locking tongues. The tongues are shown here in their bent locking position.

FIG. 5 shows the use of the splice plate with weft wires 24 of greater diameter. The FIG. 5 view corresponds to the FIG. 4 view. Note that the tongue cannot assume its fully bent locking position shown in dashed line. To enable correct use with these weft wires of larger diameter, it is seen that one edge 30 of the locking tongue 18, which edge is on the same side as the bottom of the corresponding notch 14, is inclined so that it can adapt to various weft wire diameters.

FIGS. 7 and 8 also show how the splice plate described hereinabove can be fitted to warp wires with different diameters. FIG. 7 shows the fitting of a splice plate to a cable tray using wires with a first diameter and FIG. 8 is a similar view for a cable tray using wires of greater diameter. It is seen here that the radius of curvature of the curved tongue forming the lug 12 determines the maximum diameter of the longitudinal edge wires on which the corresponding splice plate can be mounted similarly, as mentioned hereinabove, the notches of the splice plate define the maximum permissible diameter of the weft wires. It is seen in FIGS. 7 and 8 that, depending on the diameters of the wires of the cable tray, the bottom 2 of the splice plate is more or less inclined relative to the branches of the weft wires 24.

The above description concerns a preferred embodiment of a splice plate for the non-bolted connection of two sections of shallow cable tray. Here the splice is produced only by means of a warp wire (and two weft wires, of course) but guarantees a rigid connection. The splice plate can be fitted without tools. For locking only, pliers (or another suitable tool) must be provided for bending the locking tongue described.

Such a splice plate, provided essentially for assembling cable trays with only one flank wire, can also be used as splice plates on a cable tray having a plurality of flank wires or as a bottom splice plate.

This splice plate described hereinabove also has the advantage of having no edge liable to damage cables in the cable tray to which it is fitted. There is therefore no fear of damaging the cables on the splice plates when the cables are placed in the cable tray.

The splice plate described can be described as universal. It has been shown that it fits on the one hand sections of cable tray of diverse heights and on the other hand cable trays using warp and weft wires of diverse diameters.

Of course, the present invention is not limited to the preferred embodiment described hereinabove by way of nonlimiting example. It concerns equally all variant embodiments that will suggest themselves to the person skilled in the art within the scope of the following claims.

Thus various shapes may be envisaged for the splice plate. Firstly, the bottom may be a flat bottom. Such a bottom risks damaging cables to be placed in the cable tray. A rounded end could eliminate this drawback.

The presence of the separator and/or spacer tongues is advantageous but eliminating them would not depart from the scope of the invention.

The splice plate described is substantially symmetrical. A non-symmetrical shape could be equally suitable.

The trapezoidal shape of the side portions of the bottom could be replaced by numerous other shapes, rectangular, triangular or otherwise.

Other shapes can also be envisaged for the attachment means formed by the lugs described hereinabove.

It is also possible to provide a splice plate of the invention for only one wire diameter. In this case, locking means must be dispensed with. Thus there may be provision for wedging of the weft wires in the corresponding notches, for example.

In cases where locking is provided, locking means other than those described hereinabove can also be envisaged. Clipping of the weft wires into the notches can be provided for, for example.

The splice plate described hereinabove can be produced by cutting and bending sheet metal. It is produced in one piece. A splicing plate consisting of more than one piece, for example with separate attachment means, can equally be envisaged.

The invention claimed is:

1. Splice plate for wire cable trays intended to connect two sections (20) of that cable tray placed end-to-end, each section (20) of cable tray including on the one hand longitudinal warp wires (22, 26) and on the other hand transverse weft wires (24), characterized in that it has an elongate bottom (2), an upper side flange (4) extending substantially perpendicularly to the bottom (2) from a first longitudinal edge thereof, and a lower side flange (6) extending substantially perpendicularly to the bottom (2) from the longitudinal edge opposite the first longitudinal edge, in that each of the two flanges (4, 6) has at least one notch (8, 14) opening into the free edge of the corresponding flange (4, 6), the two notches (8, 14) facing each other, and in that the upper side flange (4) includes on either side of its notch (8) attachment means (12) adapted to cooperate with a warp wire (26) of a section (20) of cable tray.

2. Splice plate according to claim 1, characterized in that each flange (4, 6) includes two adjacent notches (8, 14) separated from each other by a spacer tongue (10, 16).

3. Splice plate according to claim 2, characterized in that the notches (8, 14) produced in the upper flange (4) and the lower flange (6) are substantially centrally positioned relative to the bottom (2) of the splice plate.

4. Splice plate according to claim 2, characterized in that the attachment means include a tongue (12) extending in a curved manner from the free edge of the upper flange (4) opposite the bottom (2) of the splice plate toward the bottom (2) of the splice plate, the tongue (12) being curved toward the exterior of the splice plate, i.e. to the side opposite the lower flange (6).

5. Splice plate according to claim 2, characterized in that the attachment means (12) are disposed in the vicinity of the ends of the splice plate.

6. Splice plate according to claim 2, characterized in that locking means (18) are associated with one notch (14).

7. Splice plate according to claim 1, characterized in that the notches (8, 14) produced in the upper flange (4) and the lower flange (6) are substantially centrally positioned relative to the bottom (2) of the splice plate.

8. Splice plate according to claim 7, characterized in that the attachment means include a tongue (12) extending in a curved manner from the free edge of the upper flange (4) opposite the bottom (2) of the splice plate toward the bottom (2) of the splice plate, the tongue (12) being curved toward the exterior of the splice plate, i.e. to the side opposite the lower flange (6).

9. Splice plate according to claim 7, characterized in that the attachment means (12) are disposed in the vicinity of the ends of the splice plate.

10. Splice plate according to claim 7, characterized in that locking means (18) are associated with one notch (14).

11. Splice plate according to claim 1, characterized in that the attachment means include a tongue (12) extending in a curved manner from the free edge of the upper flange (4) opposite the bottom (2) of the splice plate toward the bottom (2) of the splice plate, the tongue (12) being curved toward the exterior of the splice plate, i.e. to the side opposite the lower flange (6).

12. Splice plate according to claim 11, characterized in that the attachment means (12) are disposed in the vicinity of the ends of the splice plate.

13. Splice plate according to claim 11, characterized in that locking means (18) are associated with one notch (14).

14. Splice plate according to claim 1, characterized in that the attachment means (12) are disposed in the vicinity of the ends of the splice plate.

15. Splice plate according to claim 14, characterized in that locking means (18) are associated with one notch (14).

16. Splice plate according to claim 1, characterized in that locking means (18) are associated with one notch (14).

17. Splice plate according to claim 16, characterized in that said locking means are associated with a notch (14) formed in the lower side flange (6).

18. Splice plate according to claim 16, characterized in that the locking means include a locking tongue (18) that can be bent from a first position in which it allows free access to the notch (14) with which it is associated to a second position in which it at least partially closes said notch (14).

19. Splice plate according to claim 17, characterized in that the locking means include a locking tongue (18) that can be bent from a first position in which it allows free access to the notch (14) with which it is associated to a second position in which it at least partially closes said notch (14).

20. Splice plate according to claim 1, characterized in that the bottom (2) of the splice plate is of concave shape, the concave side being on the same side as the flanges (4, 6) of the splice plate.

* * * * *